INVENTOR.
LENNOX BIRCKHEAD, JR.
ALDEN W. OLSEN

ATTORNEY.

United States Patent Office 3,823,209
Patented July 9, 1974

3,823,209
METHOD OF FUSING TOGETHER PARTICULATE, THERMOPLASTIC MATERIAL ON A SUBSTRATE
Lennox Birckhead, Jr., Rowayton, and Alden W. Olsen, New Milford, Conn., assignors to Vitek Research Corporation, Stamford, Conn.
Filed Oct. 14, 1971, Ser. No. 189,293
Int. Cl. B29f 5/00
U.S. Cl. 264—25                 12 Claims

ABSTRACT OF THE DISCLOSURE

A method of fusing together particulate, thermoplastic material defining a layer or coating on one surface of a release mold substrate to form a self-supporting sheet which is removable from the substrate. The method includes the steps of supporting the uncoated surface of the uncoated surface of the release mold substrate in intimate and uniform contact with a surface of an insulating pad, supporting the surface of the insulating pad opposite the release mold supporting surface thereof in contact with a thermally conductive support member, applying electromagnetic radiation in the infrared region of the spectrum to the layer from only the coated side of the release mold substrate to fuse together the particulate material of said layer and removing heat from the thermally conductive support member.

BACKGROUND OF THE INVENTION

Field of the Invention

This invention relates to a method of fusing together particulate, thermoplastic material defining a layer or coating on one surface of a release mold substrate to form a self-supporting sheet which is removable from said substrate. Reference to "substrate" or "release mold substrate" throughout the specification and claims of this application refers to all substrates, including release paper substrates, which may scorch, burn, tear and/or otherwise be adversely affected by an uncontrolled amount and rate of heat transfer through, and out of said substrate during a fusing operation in which a layer of thermoplastic, particulate material is fused into a self-supporting sheet.

Description of the Prior Art

Self-supporting sheets made from fused, particulate, thermoplastic material are being seriously considered for use in many items of commerce. For example, such sheets are being considered as a substitute for leather in items such as upholstery, boots, shoes, handbags and the like. Also such sheets are being considered for use as swimming pool liners, wall coverings, floor coverings and other decorative surfaces.

Self-supporting sheets can be formed by depositing particulate, thermoplastic material as a layer or coating on one surface of a release mold substrate such as a release paper substrate, at a powder deposition station, and fusing together the particulate material defining said layer at a powder fusing station. The fused layer defines a self-supporting sheet which is removed from the release mold substrate. Release paper substrates are extremely desirable for use as molds in forming self-supporting sheets because release paper substrates having different embossed patterns are relatively inexpensive and can be substituted easily for each other to form self-supporting sheets with different patterns imposed in a surface thereof.

The thermal resistance to the conduction of heat through a dry layer of particulate, thermoplastic material is greater than the thermal resistance to the conduction of heat through a plastisol (liquid) layer. Therefore, more severe heating conditions are required to completely fuse together particulate material than to cure plastisol in a conventional plastisol casting operation. When a circulating hot air oven, which is normally utilized to cure plastisol, is utilized to completely fuse together particulate, thermoplastic material, these more severe heating conditions are achieved by either increasing the temperature of the hot circulating air, or increasing the residence time during which the particulate material is exposed to heat or increasing both the temperature and the residence time. These more severe heating conditions tend to dry out certain release mold substrates, such as release paper substrate, to cause scorching and/or burning thereof after fewer uses than in a conventional plastisol casting process. After the release mold substrate scorches and/or burns, it normally is not reusable. Obviously, the cost of manufacturing self-supporting sheets is increased as the number of times that a release mold substrate can be reused is reduced.

In a continuous fusing process in which a release mold substrate containing a layer of particulate, thermoplastic material thereon is moved through a circulating hot air oven at speeds of 60 feet per minute or greater, relatively long ovens are required to provide the necessary heat conditions to completely fuse together the particulate material into a self-supporting sheet. These long ovens require the use of large production areas which are often not available, or which could be utilized for other production operations.

Attempts have been made to utilize short wavelength electromagnetic radiation, such as infrared radiation, to fuse together particulate, thermoplastic material on a release mold substrate into a self-supporting sheet which can be removed from said substrate. In such attempts the release mold substrate has been supported on metal belts or rolls, and the short wavelength electromagnetic radiation has been applied from only the uncoated side of the release mold substrate, from only the coated side of said substrate, and simultaneously from both sides of said substrate. All these attempts have failed to provide effective control of the amount and rate of heat transfer through and out of the particulate, thermoplastic layer and the release mold substrate. This ineffective control of heat transfer has often resulted in a scorching and/or burning of the release mold substrate. Furthermore, when short wavelength electromagnetic radiation is applied from only the side of the release mold substrate containing the particulate, thermoplastic layer thereon, the ineffective control of heat transfer by conduction through the polymeric layer has caused excessive heat exposure of the particulate material adjacent the exposed surface thereof prior to the particulate material adjacent the release mold substrate being brought up to a sufficiently high temperature to both wet the surface of said substrate and fuse together. This excessive heat exposure has caused the exposed surface of particulate material to decompose, resulting in a rejectable product.

The use of a hot platen in intimate contact with the uncoated surface of a release mold substrate in conjunction with the application of short wavelength electromagnetic radiation from only the coated side of said substrate has provided effective control of the amount and rate of heat transfer through and out of the particulate, thermoplastic layer and said substrate to permit the formation of a self-supporting sheet without decomposing portions of the particulate material, and without scorching and/or burning said substrate. According to this fusing method, the release mold substrate is brought up to the fusing temperature of the particulate material by conduction of heat from the hot platen through the release mold substrate. The time required to bring the release mold substrate up to this fusing temperature has created an undesirable speed impediment in a continuous fusing operation. In addition, the use of a hot platen in conjunction with an infrared heating source complicates the fusing equipment by requiring the use of two separate heat sources.

SUMMARY OF THE INVENTION

This invention relates to a method of fusing together particulate, thermoplastic material in the form of a layer or coating on one surface of a release mold substrate by applying short wavelength electromagnetic radiation, such as infrared radiation, to said layer from only the coated side of said substrate while supporting the opposite, uncoated side of said substrate in intimate and uniform contact with a surface of an insulating pad. It is critical in this invention to maintain intimate and uniform contact between the uncoated surface of the release mold substrate and the insulating pad in order to achieve a controlled, uniform rate of heat transfer through the layer of particulate material and the release mold substrate into the insulating pad. A non-uniform rate of heat transfer can cause a scorching and/or burning of the release mold substrate in localized regions thereof in which the rate of heat transfer from the substrate into the insulating pad is too low. Also, a non-uniform rate of heat transfer can result in the too rapid removal of heat from the particulate layer and release mold substrate in localized regions thereof to cause an excessive heat exposure of particulate material adjacent the exposed surface of the layer prior to the generation of sufficient heat at the interface of the release mold substrate and the layer of particulate material in said localized regions to cause the particulate material adjacent said release mold substrate to wet the surface of said substrate and to fuse together in said localized regions. This excessive heat exposure decomposes particulate material adjacent the exposed surface of the layer resulting in a rejectable product.

In the most preferred embodiment of this invention, the surface of the insulating pad opposite its release mold substrate supporting surface is maintained in contact with a thermally conductive support member. This thermally conductive support member functions as a heat sink to receive heat from the insulating pad. In the most preferred embodiment of the invention, the thermally conductive support member is cooled by the application of a cooling medium, such as water or air, to the exposed surface of the support member. The application of a cooling medium to the exposed surface of the support member assures that sufficient heat is removed from the support member so that it can properly function as a heat sink to remove heat from the insulating pad. Therefore, the thermally conductive support member prevents the insulating pad from overheating when long heat exposure times are utilized. The overheating of the insulating pad can cause said insulating pad to dry out and become brittle and/or decompose. Also, the overheating of the insulating pad can cause an overheating of the release mold substrate, and thereby dry out and scorch and/or burn said substrate. The thermally conductive support member in conjunction with the application of a cooling medium thereto aids in achieving a controlled, uniform rate of heat transfer through and out of the layer of particulate material and the release mold substrate into the insulating pad when the short wavelength electromagnetic radiation is applied from only the coated side of said substrate.

In the most preferred embodiment of this invention, the insulating pad is porous and the thermally conductive support member has vaccum passages therethrough. The release mold substrate is supported and maintained in the required intimate and uniform contact with said insulating pad by establishing a partial vacuum through the vacuum passages in the thermally conductive support member, and through the porous insulating pad.

In the most preferred embodiment of this invention, the marginal edges of the release mold substrate are covered by suitable insulating sealing means, such as insulating rubber sealing strips, to prevent exposure of the marginal edges of the release mold substrate to the heat generated during the fusing operation. Fusing heat applied to the exposed edges of the release mold substrate can cause a rapid drying out of said edges. When the edges dry out they tend to crack and/or tear, and thereby reduce the useful life of the substrate.

It is an object of this invention to provide a controlled, uniform rate of heat transfer through, and out of a release mold substrate and a layer of particulate, thermoplastic material to fuse the layer into a self-supporting sheet.

It is a further object of this invention to fuse together substantially all particulate, thermoplastic material defining a layer on one surface of a release mold substrate to form a self-supporting sheet without decomposing any of said particulate material.

It is a further object of this invention to fuse together substantially all particulate, thermoplastic material defining a layer on one surface of a release mold substrate to form a self-supporting sheet without scorching, burning and/or otherwise adversely affecting the release mold substrate.

It is a further object of this invention to fuse together particulate, thermoplastic material defining a layer on one surface of a release mold substrate while preventing marginal edges of said substrate from drying out, and cracking and/or tearing.

Other objects and advantages of this invention will become apparent in view of the detailed description which follows, taken in conjunction with the following drawings.

DESCRIPTION OF THE PREFERRED EMBODIMENT OF THE INVENTION

Figure 1:
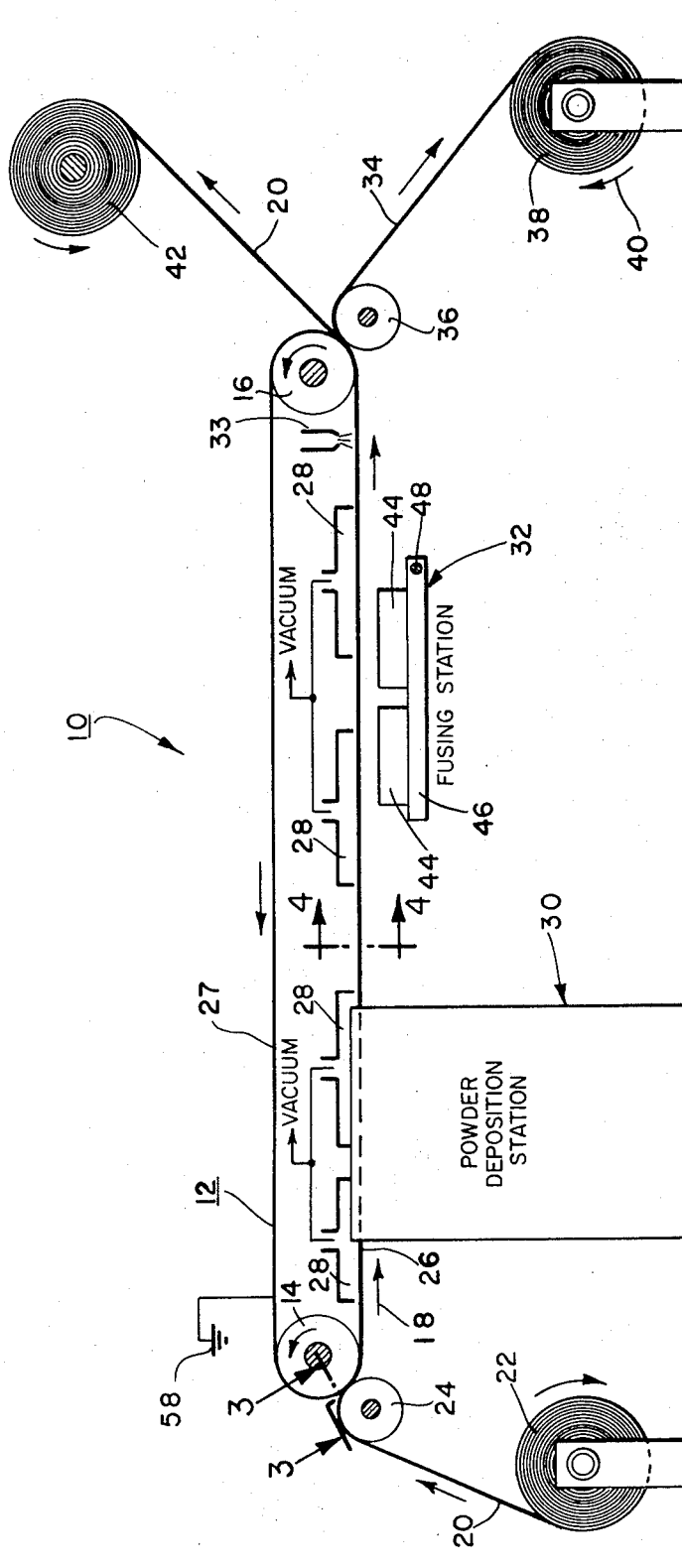
FIG. 1 is a schematic elevation view of a powder deposition system in which the method of this invention can be practiced.

This invention relates to the fusing together of particulate, thermoplastic material defining a layer or coating on one surface of a release mold substrate to form a self-supporting sheet. The particulate materials which can be utilized in the practice of the method of this invention include all of those normally thermoplastic materials which are available in particulate form, and which will fuse into a self-supporting sheet upon being heated to their fusion temperature. Preferably these particulate materials are polymers, such as polyethylene, polypropylene, compounded dry-blended poly (vinyl chloride), certain polyurethanes, polystyrene, poly (methyl methacrylate) homo- and copolymers, cellulose acetate, butyrate and propionate, certain nylons and the like.

The method of this invention is particularly suited for use with release paper substrates which are commercially available and well-known in the prior art. One typical release paper substrate which can be utilized in practicing the method of this invention is sold under the trademark "Transkote" by S. D. Warren Company, a division of Scott Paper Company. A release paper substrate is typically produced from a relatively heavy stock which is treated with proprietary compositions designed to prevent sticking of the fused sheet to said substrate to thereby permit removal of said fused sheet from said substrate.

The specific method of applying particulate, thermoplastic material to a release mold substrate to form a layer thereon does not form a part of the present invention; however, the layer should be applied as a relatively uniform coating in order that the fused, self-supporting sheet will be relatively uniform in thickness. Typical processes which may be used to apply the particulate material to a release mold substrate are electrostatic spraying, fluid bed techniques, electrostatic fluid bed techniques and the like, all of which are well known in the prior art.

According to applicant's invention, a release mold substrate having a layer or coating of particulate, thermoplastic material disposed on one surface thereof, has its opposite, uncoated surface supported in intimate and uniform contact with the surface of an insulating pad. The layer of particulate material is heated by short wavelength electromagnetic radiation, such as infrared radiation, directed toward the coated release mold substrate from only the coated side thereof to fuse together completely the particulate, thermoplastic material of said layer into a self-supporting sheet. By supporting the uncoated surface of the release mold substrate in intimate and uniform contact with the insulating pad, a controlled, uniform rate of heat transfer is achieved through, and out of the layer of particulate material and the release mold substrate. It is extremely important that the heat applied to the coated release mold substrate be removed at a controlled, uniform rate to permit contiguous surfaces of the release mold substrate and the layer of particulate material to be raised to the fusion temperature of the particulate material without decomposing the particulate material adjacent the exposed surface of the layer, and without scorching, burning and/or otherwise adversely affecting said release mold substrate.

The specific insulating materials utilized to form the insulating pad must be stable, i.e. must not melt or decompose, under the temperature conditions employed during the fusing operation, i.e. about 400° F. to about 600° F. Preferably, the insulating materials have a conductivity factor in the range of from about 0.01 to about 0.1 B.t.u./ (hr.) (sq. ft.) (° F./ft.) under the temperature conditions employed during the fusing operation. Insulating materials within the above conductivity range permit a sufficiently slow rate of heat transfer through the release mold substrate to permit contiguous surfaces of said release substrate and the layer of particulate material to be brought up to a sufficiently high temperature to cause the particulate material to wet said substrate and fuse together without heating the particulate material adjacent the opposite, exposed surface of the layer so excessively as to decompose the particulate material adjacent said exposed surface. Asbestos, cotton wool, hair felt, and nylon are examples of insulating materials which can be utilized to form the insulating pad employed in the method of this invention. In the most preferred embodiment of this invention the insulating pad has a thickness in the range of from about 1/16" to about 1/2", and is comprised of a high-temperature nylon sold by Dupont Company under the trademark "Nomex." Preferably, the insulating pad is flexible to permit contiguous surfaces of said insulating pad and the release mold substrate to conform to each other to thereby aid in establishing intimate and uniform contact between said substrate and said insulating pad. The insulating pad should retain its flexibility under the temperature conditions employed during the fusing operation. Also, the insulating pad preferably is porous for a purpose which will be explained later in this application.

In the most preferred embodiment of this invention a thermally conductive support member is disposed in contact with the surface of the insulating pad opposite its release mold substrate supporting surface. The thermally conductive support member functions as a heat sink to receive heat by conduction from the insulating pad to aid in achieving a controlled, uniform rate of heat transfer through, and out of the layer of particulate material, the release mold substrate and the insulating pad. Preferably the thermally conductive support member is a stainless steel belt having a thickness in the range of from about 30 mils to about 50 mils. Stainless steel is preferred because it will not corrode under the conditions employed during the fusing operation; however, other thermally conductive materials which will not corrode can be used in the method of this invention.

In the preferred embodiment of this invention, the short wavelength electromagnetic radiation is infrared radiation applied to the exposed surface of the layer of particulate material by ceramic radiatiors which have a surface temperature in the range from about 1600° F. to about 2400° F. These radiatiors preferably are disposed at a distance of from about two inches to about eight inches from the exposed surface of the layer. The specific temperatures employed during the fusing operation, the specific spacing of the heating means from the exposed surface of the layer of particulate material and the specific residence time to which said layer is exposed to the electromagnetic radiation does not constitute a limitation upon the present invention. These parameters will vary depending upon the particular material being fused, and can be determined empirically with little effort by people skilled in the art.

In the most preferred embodiment of this invention the thermally conductive support member is exposed to a cooling medium, such as water or air, during and/or immediately after the fusing operation to withdraw heat from said thermally conductive support member. Withdrawing heat from the thermally conductive support member assures that a temperature gradiant is maintained between the layer of particulate material and the thermally conductive support member which aids in affecting a controlled, uniform rate of heat transfer, through and out of the layer of particulate material, the release mold substrate and the insulating pad.

As stated earlier in this application, it is critical to this invention that the release mold substrate be maintained in substantially intimate and uniform contact with the insulating pad. This intimate and uniform contact preferably is achieved by applying a partial vacuum through vacuum passages disposed through the thermally conductive support member. The insulating pad is porous to permit the partial vacuum to act therethrough to firmly retain the release mold substrate in intimate and uniform contact therewih.

In the most preferred embodiment of this invention, uncoated marginal edges of the release mold substrate are sealed by suitable insulating sealing means, such as silicone rubber sealing strips, to prevent exposure of said marginal edges to the heat generated by the heat source during the fusing operation. Fusing heat applied to the exposed marginal edges may cause a rapid drying out of said edges to thereby cause cracking and/or tearing of said edges. Cracking and/or tearing of the marginal edges of the release mold substrate reduces the useful life of said substrate. The sealing means are preferably secured to the thermally conductive support member to define a closed vacuum chamber with said support member, whereby the vacuum applied through the vacuum passages will effectively retain the release mold substrate in intimate and uniform contact with the porous insulating pad. If desired, the sealing means can be separate members which are either stationary or moving, and which are maintained in contact with the support member by suitable pressure members, such as rolls or plates.

Referring to FIGS. 1–4, a preferred apparatus for carrying out the method of this invention will be described for purposes of completeness. Referring specifically to FIG. 1, a powder deposition system 10 for carrying out the method of this invention includes an endless conveyor belt construction 12 disposed about spaced pulleys 14 and 16, one of which is driven by conventional drive means (not shown) to drive the conveyor belt construction in the direction indicated by arrow 18. A release mold substrate 20 is fed from a supply roll 22 over a guide roll 24 into engagement with a lower coating run 26 of the endless conveyor belt construction 12. The release mold substrate 20 is retained in intimate and uniform engagement with the endless conveyor belt construction 12 by a plurality of vacuum shoes 28 which are connected to a suitable source of vacuum, as is schematically indicated in FIG. 1, and as will be described more fully hereinafter. The release mold substrate 20 is directed through a powder deposition station 30 at which a layer 31 (FIG. 4) of particulate, thermoplastic material is deposited thereon. The release mold substrate 20 with the layer 31 thereon is then directed past a fusing station 32 at which the particulate material defining the layer 31 is fused together. The fused layer is directed past a cooling station 33, which may comprise water spray nozzles to withdraw heat from the conveyor belt construction and thereby aid in cooling the fused layer. The fused, self-supporting sheet 34 can be separated from the release mold substrate 20 at a take-off roll 36. The sheet 34 is directed from the take-off roll 36 to a storage roll 38 which is positively driven by conventional drive means (not shown) in the direction indicated by arrow 40. The release mold substrate 20 is directed to a positively driven rewind roll 42 for storage and/or subsequent use. A similar storage roll and rewind roll would be provided adjacent the downstream end of the return run 27 if separation is effected thereat.

The fusing station 32 includes radiant heaters 44 which direct infrared radiation to the coated, release mold substrate from only the coated side thereof. The radiant heaters 44 are mounted on a support member 46 that is pivotally adjustable about an axle 48 by any conventional drive system (not shown) to permit adjustment of the radiant heaters.

Figure 2:
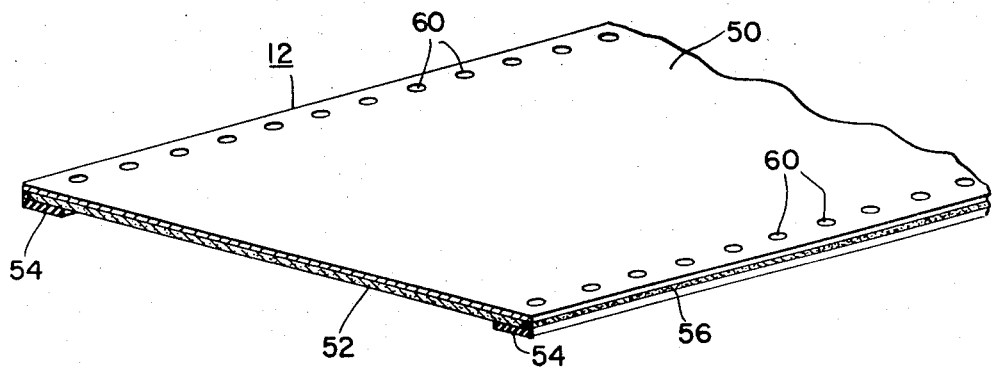
FIG. 2 is a fragmentary diametric view of a conveyor belt construction for supporting a release mold substrate in practicing the method of this invention.
Figure 4:
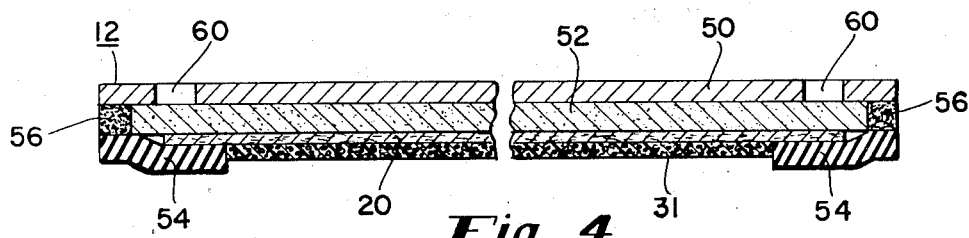
FIG. 4 is a sectional view along line 4—4 of FIG. 1.

The endless conveyor belt construction 12 for supporting the release mold substrate 20 in the practice of the method of this invention is the joint invention of Lennox Birckhead, Jr., Charles P. Evans, and Alden W. Olsen, and is covered in Application Ser. No. 139,265, titled Conveyor Belt Construction, filed on even date now U.S. Pat. 3,745,856 issued July 17, 1973. Referring to FIGS. 2 and 4, the endless conveyor belt construction 12 includes a thermally conductive support belt 50, a porous insulating material in the form of a pad 52 and end sealing strips 54. The end sealing strips are constructed of an insulating material such as silicone rubber, and are cemented at 56 adjacent each marginal edge of the supporting belt 50. When the conveyor belt construction 12 is utilized in an electrostatic powder deposition system the supporting belt 50 should also be electrically conductive to permit suitable grounding, such as is indicated at 58 in FIG. 1.

Vacuum ports 60 are disposed adjacent each marginal edge of the supporting belt 50, and a vacuum is applied through these ports by the vacuum shoes 28 which are fixed against movement to suitable frame members (not shown). In operation, the supporting belt 50 is fed in sliding engagement with the vacuum shoes 28 along the coating run 26 so that a vacuum is continuously applied through the vacuum ports 60, and therefore, through the porous insulating pad 52 to retain the release mold substrate 20 in intimate and uniform contact with said insulating pad 52.

Figure 3:
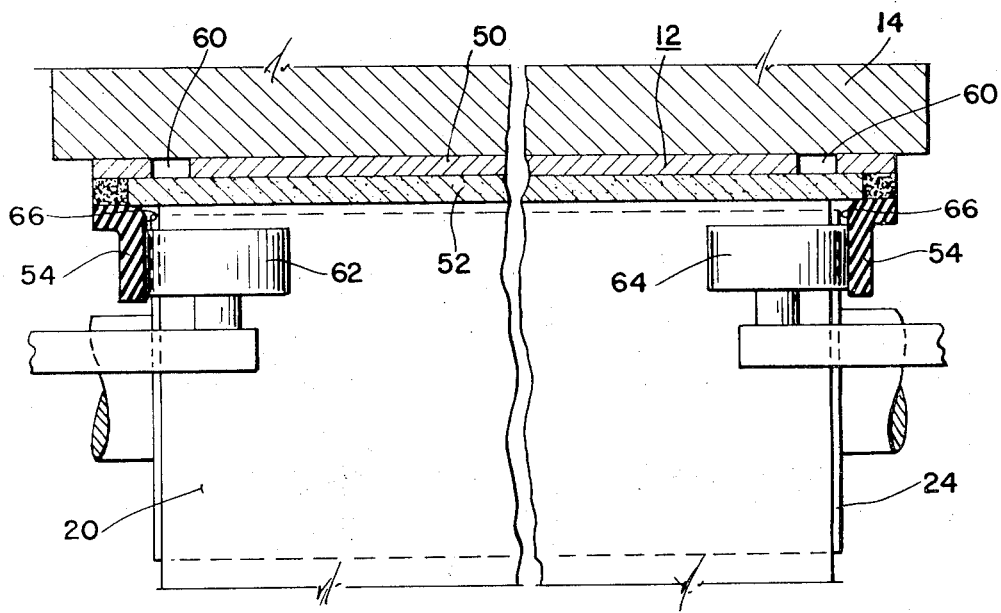
FIG. 3 is a sectional veiw along line 3—3 of FIG. 1.

Referring to FIG. 3, a pair of rollers 62 and 64 are disposed adjacent the guide roll 24 at the upstream end of the endless conveyor belt construction 12. The sealing strips 54 are peeled back from the insulating pad 52, and are disposed about the peripheral surface of each of the rolls 62 and 64 to permit the release mold substrate 20 to be fed against the insulating pad 52 with end margins of said release mold substrate disposed between said insulating pad and the inner surfaces 66 of the sealing strips 54 as the endless conveyor belt construction 12 moves past the guide roll 24. As the sealing strips 54 pass rollers 62 and 64 in the direction indicated by arrow 18 in FIG. 1, they return to their normally closed position shown in FIG. 4 to seal the end margins of the release mold substrate 20 to protect said end margins from the heat generated during the fusing operation. Also, the sealing strips 54 aid in providing a closed vacuum system in which a sufficient vacuum can be maintained through the insulating pad 52 to firmly, but gently, hold the release mold substrate 20 in intimate and uniform contact with said insulating pad. The conveyor belt construction 12 with the release mold substrate 20 supported thereon is directed past the powder deposition station 30, at which the layer 31 is deposited, past the fusing station 32, at which said layer is fused, and past the cooling station 33, at which heat is withdrawn from the conveyor belt construction to aid in forming the self-supporting sheet 34 according to the method of this invention.

What is claimed is:

1. A method of fusing together particulate, thermoplastic materail defining a layer or coating on one surface of a substrate by establishing a controlled rate of heat transfer through said layer and substrate to avoid adversely affecting either said layer or substrate, said method comprising the steps of:

A. positioning an air-pervious insulating pad adjacent the surface of the substrate opposite the surface thereof upon which said layer of particulate, thermoplastic material is disposed;

B. establishing a partial vacuum through said air-pervious insulating pad for establishing intimate and uniform contact between the insulating pad and the adjacent surface of the substrate; and C. applying electromagnetic radiation in the infrared range from only the side of said substrate containing said layer of particulate, thermoplastic material while the insulating pad and the adjacent surface of the substrate are in intimate and uniform contact in order to achieve a controlled rate of heat transfer through the layer of particulate material and the substrate to thereby heat and fuse together the particulate material defining said layer.

2. The method according to claim 1, wherein said substrate is a release paper substrate.

3. The method according to claim 1, comprising the step of positioning the source of infrared radiation from about two to about eight inches from said layer.

4. The method according to claim 1, comprising the additional step of supporting the surface of the insulating pad opposite its substrate contacting surface in contact with a surface of a thermally conductive support member and applying said partial vacuum through the conductive support member and insulating pad for establishing said intimate and uniform contact between the insulating pad and the substrate.

5. The method according to claim 4, comprising the additional step of directing a cooling medium onto the surface of the thermally conductive support member opposite the surface thereof which is in contact with the insulating pad.

6. The method according to claim 4, wherein said insulating pad has a conductivity factor in the range of from about 0.01 to about 0.1 B.t.u/(hr.) (sq. ft.) (° F/ft.).

7. A method of fusing together particulate, thermoplastic material defining a layer on one surface of a substrate by establishing a controlled rate of heat transfer through said layer and substrate to avoid adversely affecting said layer or substrate, said method comprising the steps of:

A. positioning an air-pervious insulating pad adjacent the surface of the substrate opposite the surface thereof upon which said layer of particulate, thermoplastic material is disposed;

B. establishing a partial vacuum through said air-pervious insulating pad for establishing intimate and uniform contact between the insulating pad and the adjacent surface of the substrate;

C. continuously moving said substrate past a source of electromagnetic radiation in the infrared range while maintaining said intimate and uniform contact between said substrate and said insulating pad; and D. applying electromagnetic radiation in the infrared range from said source from only the side of said substrate containing said layer of particulate, thermoplastic material while the insulating pad and the adjacent surface of the substrate are in intimate and uniform contact in order to achieve a controlled rate of heat transfer through the layer of particulate material and the substrate to thereby heat and fuse together the particulate material defining said layer.

8. The method according to claim 7, comprising the additional step of supporting the surface of the insulating pad opposite its substrate contacting surface in contact with a surface of a thermally conductive support member and applying said partial vacuum through the conductive support member and insulating pad for establishing said intimate and uniform contact between the insulating pad and the substrate.

9. The method according to claim 7, wherein said substrate is a release paper substrate.

10. The method according to claim 8, comprising the additional step of directing a cooling medium onto the surface of the thermally conductive support member opposite the surface thereof which is in contact with the insulating pad.

11. The method according to claim 7, comprising the step of positioning the source of infrared radiation from about two to about eight inches from said layer.

12. The method according to claim 8, wherein said insulating pad has a conductivity factor in the range of from about 0.01 to about 0.1 B.t.u./(hr.) (sq. ft.) (° F./ft.).

References Cited
UNITED STATES PATENTS

| | | | |
|---|---|---|---|
| 3,487,132 | 12/1969 | Thorne | 264—126 X |
| 3,099,042 | 7/1963 | Rabl | 264—126 |
| 2,960,727 | 11/1960 | Bradshaw et al. | 264—126 |
| 2,405,191 | 8/1946 | Davis | 117—17 X |
| 2,560,855 | 7/1951 | Flanagan | 264—327 X |
| 3,385,722 | 5/1968 | Weaver | 117—21 |
| 2,094,348 | 9/1937 | Carlson | 117—44 X |
| 3,226,457 | 12/1965 | Smith | 264—90 |

ROBERT F. WHITE, Primary Examiner

T. P. PAVELKO, Assistant Examiner

U.S. Cl. X.R.

117—17, 21; 156—272; 264—90, 112, 126, 316, 327, Dig 46, Dig 78; 425—174.4